Sept. 26, 1967  M. G. COMBES  3,343,562
PIVOTED VALVE CONSTRUCTION
Filed Jan. 15, 1965  6 Sheets-Sheet 1

INVENTOR.
MARVIN G. COMBES
BY
Gregg & Stidham
ATTORNEYS

Sept. 26, 1967 M. G. COMBES 3,343,562
PIVOTED VALVE CONSTRUCTION
Filed Jan. 15, 1965 6 Sheets-Sheet 2
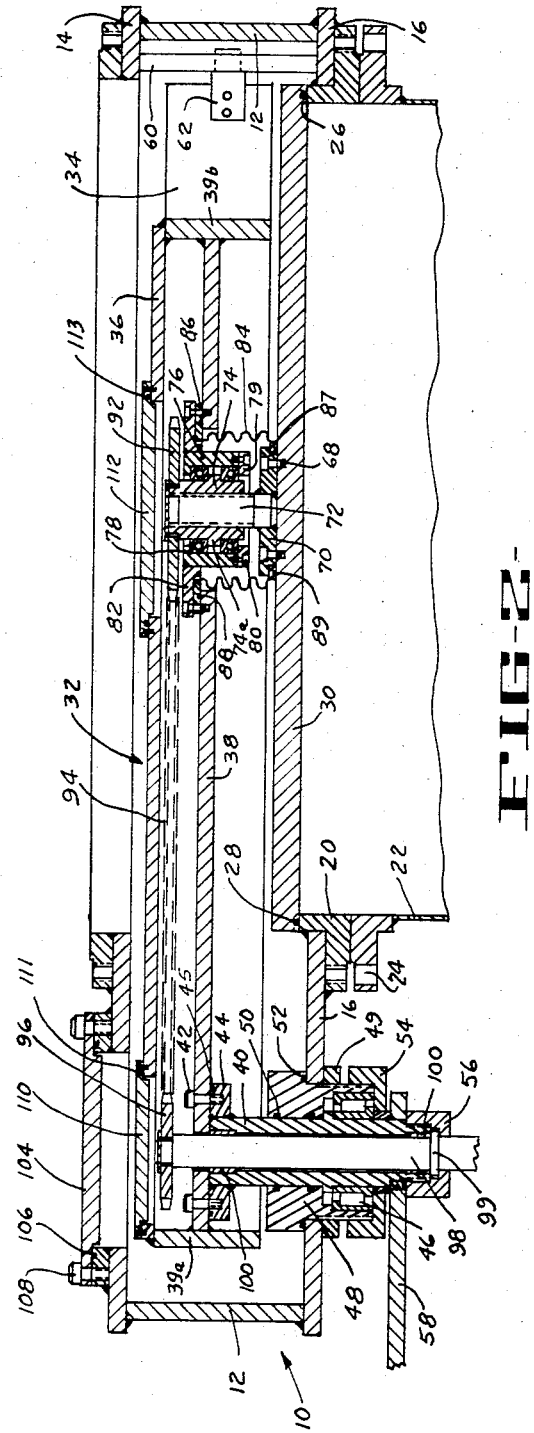
INVENTOR.
MARVIN G. COMBES
BY
Gregg & Stidham
ATTORNEYS

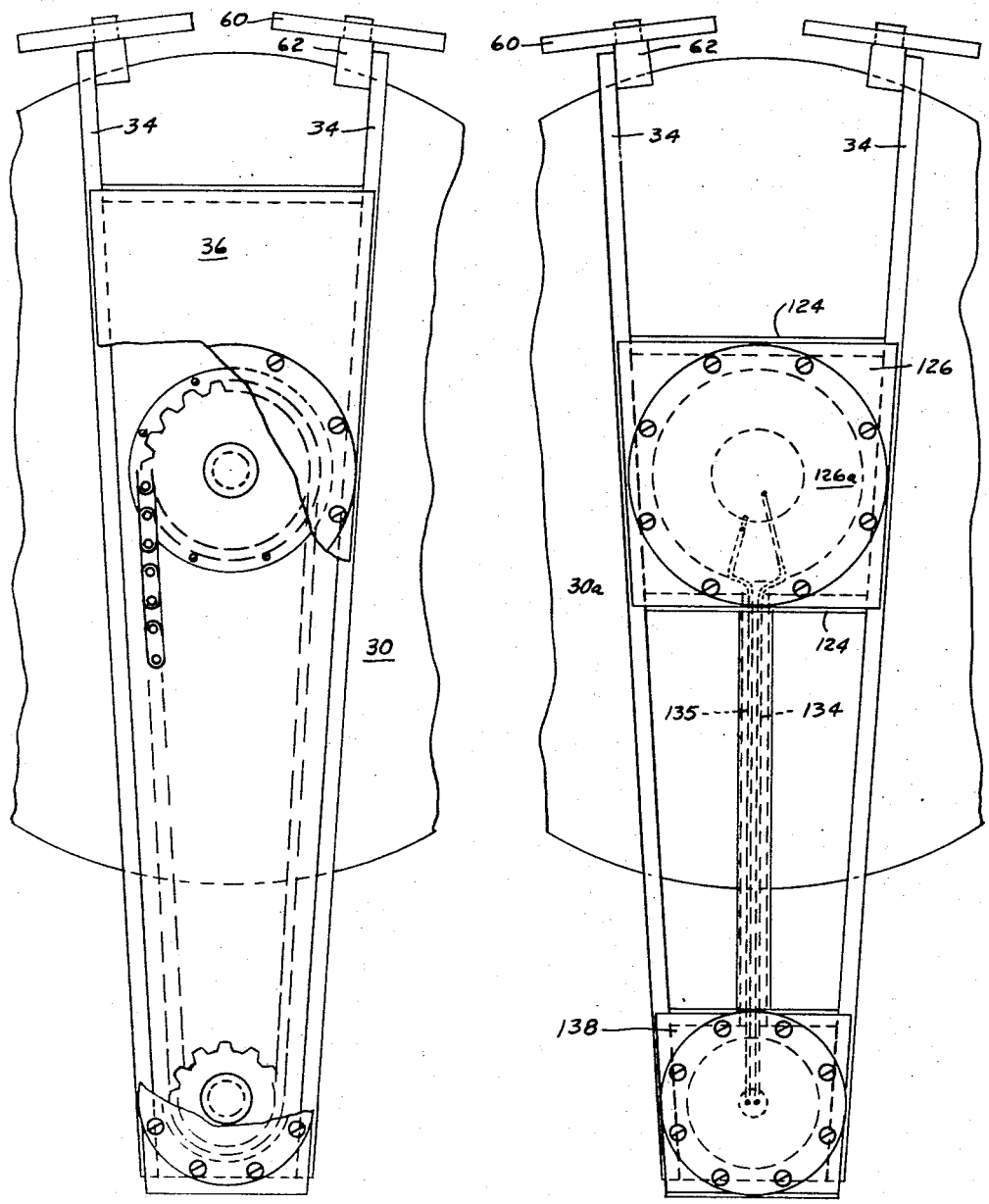

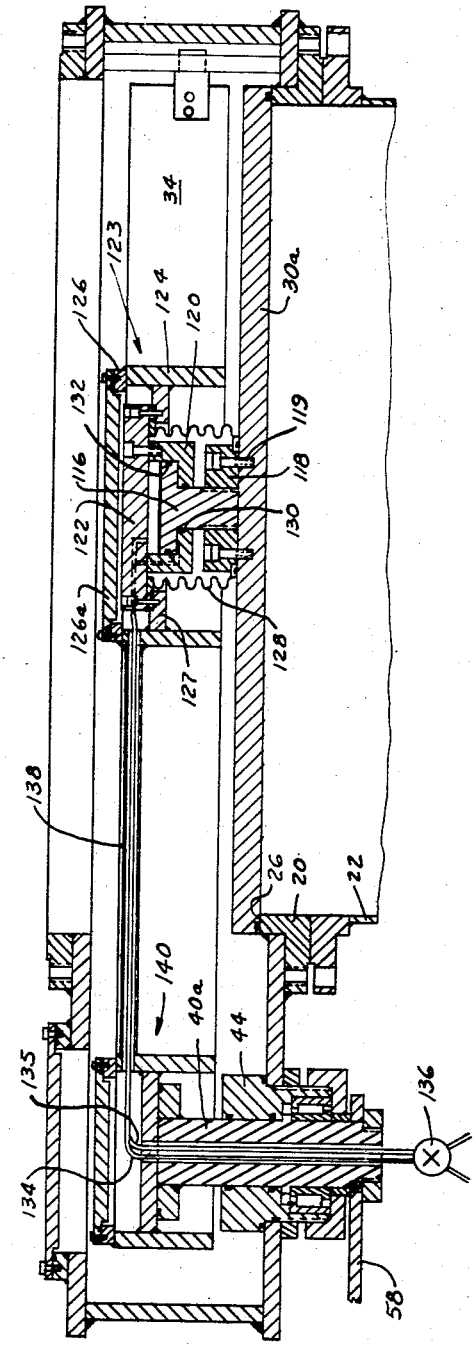

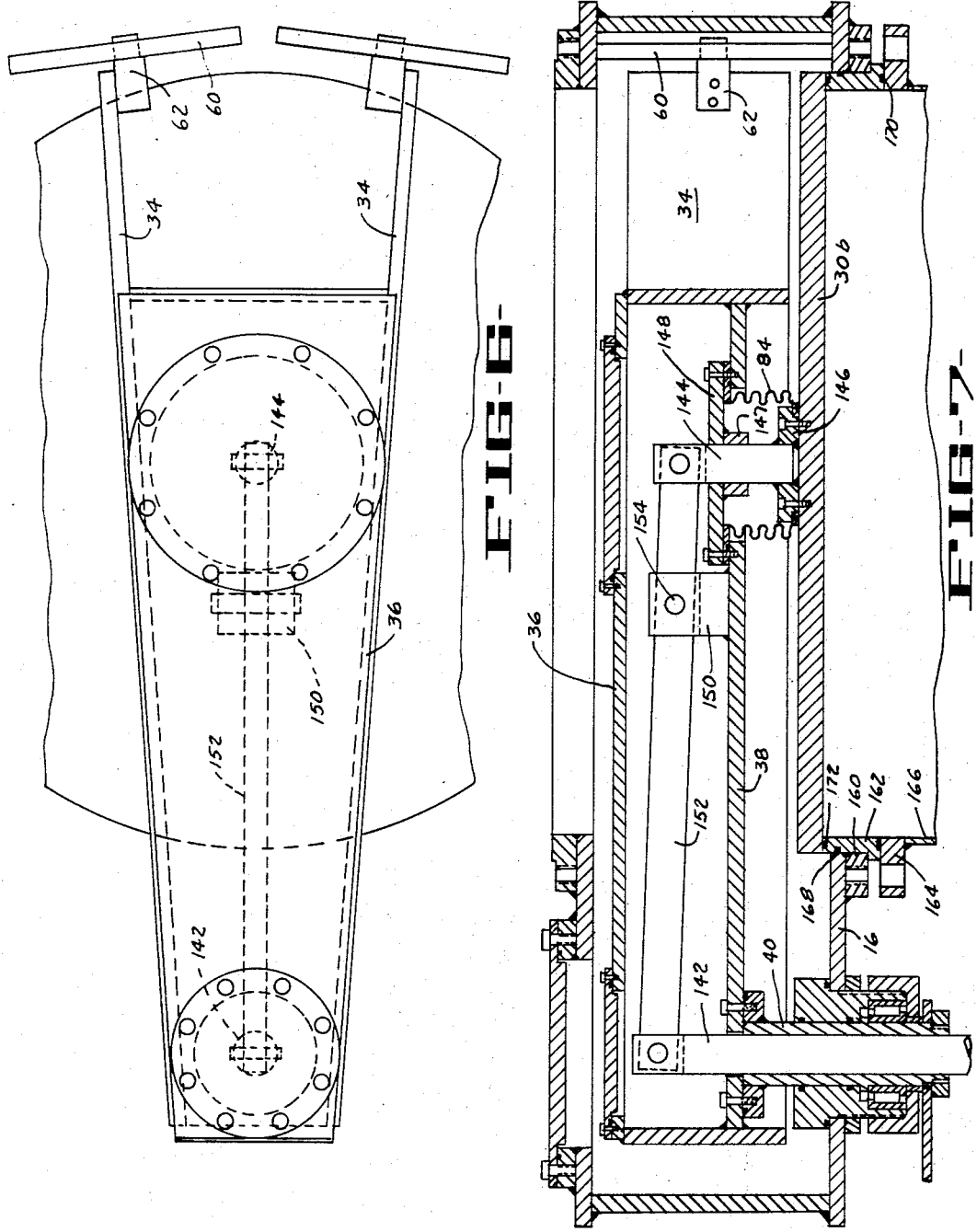

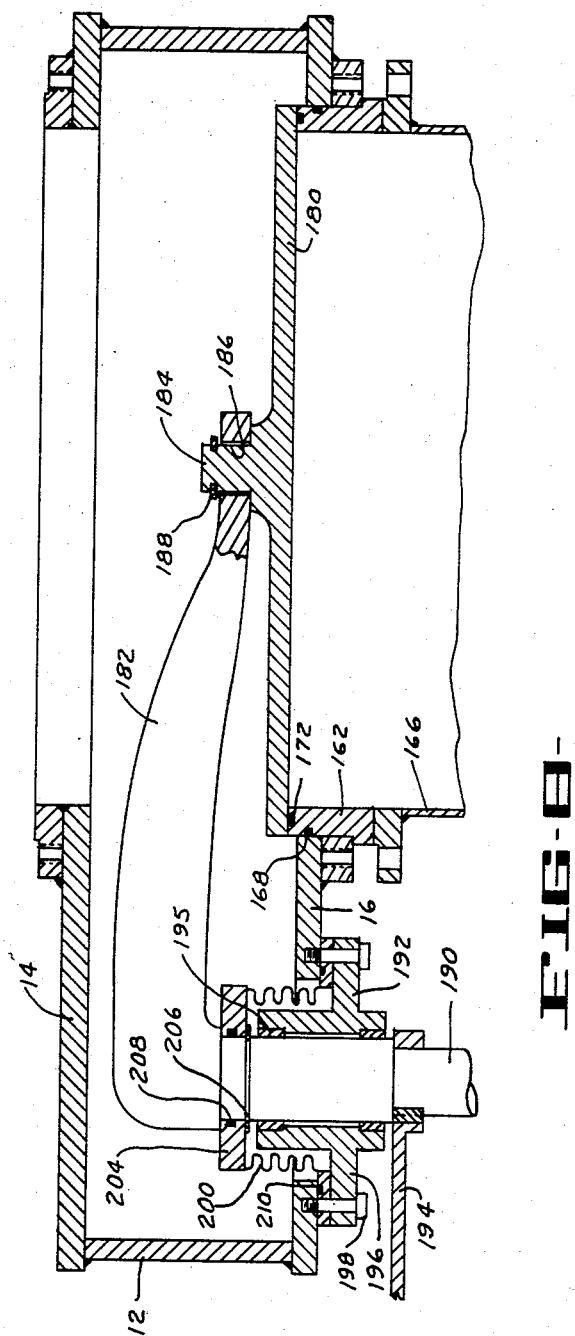

United States Patent Office 3,343,562
Patented Sept. 26, 1967

3,343,562
PIVOTED VALVE CONSTRUCTION
Marvin G. Combes, Castro Valley, Calif., assignor to Grove Valve and Regulator Company, Oakland, Calif., a corporation of California
Filed Jan. 15, 1965, Ser. No. 425,885
11 Claims. (Cl. 137—315)

ABSTRACT OF THE DISCLOSURE

A vacuum valve having a closure disc supported on a carrier arm for pivotal movement on a shaft into and out of alignment with a valve seat. The shaft and carrier arm are hollow and in fluid-tight isolation from the valve body. Motion transmitting means are carried from a power source through the shaft and carrier arm to operate an axially extensible connection between the carrier arm and the closure disc for seating and unseating the disc.

Description

This invention relates to a valve construction and more particularly to a disc or plate type valve that is particularly adapted for installation in vacuum systems.

In high vacuum systems, it is necessary to operate valves and other mechanisms without the use of lubricants to reduce friction since, under a high vacuum, the lubricant molecules would be evacuated along with the molecules of air, vapor and other particles. As a consequence, valves which are employed in such systems may be subjected to severe abrasion of relatively movable surfaces, including the finely ground working surfaces of valve members and seats, and cutting of resilient seals. Efforts have been made to move the valve closure member in a transverse direction along the axis of the flow passage into and out of engagement with the seat, rather than sliding it across the seat as in conventional gate valves, ball valves, butterfly valves and the like. However, if the closure member is merely moved axially away from the seat, it still tends to block the flow passage and prevent free and unimpeded fluid flow. Consequently, it is also desirable, after the closure member is moved axially away from the seat, to move it radially and free the flow passage for full flow condition.

Others have developed mechanical systems which are designed to produce axial and then radial compound movement of a valve closure memebr, but such systems often require other mechanisms with relative movable parts. As a result, such systems may reduce causes of abrasion of the smoothly finished working surfaces of the valve, but the additional operating elements are themselves subject to wear and abrasion, particularly if they extend into the valve interior where they are exposed to the effects of the evacuation system that deprives them of lubrication.

It is, therefore, an object of this invention to provide a valve wherein many relatively movable elements may be lubricated even though the valve is employed in a vacuum system.

It is a further object of this invention to provide a valve that is particularly adapted for use in a valve vacuum system wherein the operating mechanism of the valve within the valve body is isolated from the remainder of the valve interior.

It is a further object of this invention to provide a disc valve that may be operated through a single shaft member extending to the exterior of the valve to swing the disc into and out of alignment with a flow passage and then to move the disc axially into and out of seating engagement.

It is a further object of this invention to provide a swing disc valve that is economical to manufacture and is simple and reliable in operation.

In carrying out this invention, I provide a hollow, pivotally-mounted carrier arm for a valve closure disc so that it may swing within the valve body in a plane parallel to the valve seat. The mechanical connection between the valve disc and the carrier arm is designed to effect a certain amount of axial movement of the disc in a direction toward and away from the valve seat so that when the disc is swung into alignment with the seat, it may be moved axially into sealing engagement therewith.

In one form of the invention, the mechanical connection between the disc and the carrier arm comprises a fulcrum that is secured within the hollow carrier arm and a lever arm that is pivotally mounted on the fulcrum and connected at one end to the closure disc, and at the other end to a rod or link. The actuating rod is movable longitudinally in a hollow shaft on which the carrier is mounted for pivotal movement.

In another form of the invention, the connection between the carrier arm and the valve disc comprises a connector member that is rotatably mounted on the carrier arm and is threadedly connected to a member which, in turn is fixed on the valve disc. A drive shaft is rotatably mounted within an axial passage through that shaft on which the hollow carrier arm is mounted, and the drive shaft extends up into the hollow carrier arm. A chain drive connected between sprockets on the drive shaft and the rotatable connector member, respectively, converts rotation of the drive shaft after the disc is swung into place, rotation of the threaded connection and, hence, axial movement of the disc.

In still another form of the invention, the connection between the valve disc and the carrier comprises a fluid cylinder and piston arrangement, and fluid pressure and return lines are introduced into the valve body through the hollow main valve shaft, whereby the piston may be extended or retracted to effect closing or opening of the valve disc.

It is a further feature of this invention to provide a carrier arm in the form of a hollow, fluid-tight vessel having sealed access openings to the mechanisms that produce the swinging and axial movement of the gate. The mechanisms for operating the valve disc are contained within the fluid-tight carrier arm and, therefore, are isolated from the vacuum system in which the valve is installed. Consequently, such mechanisms may be freely lubricated.

Other objects and advantages of this invention will become apparent from the description following, when read in conjunction with the accompanying drawings wherein:

FIG. 2 is a vertical section view of the valve of FIG. 1;

FIG. 3 is a partial top plan view of the operating mechanism of the disc valve of FIG. 1 embodying features of this invention;

FIG. 4 is a partial top plan view of another form of disc valve operating mechanism embodying features of this invention;

FIG. 5 is a vertical section view of a valve including the operating mechanism of FIG. 4;

FIG. 6 is a partial top plan view of another form of valve operating mechanism;

FIG. 7 is a vertical section view of a valve including the operating mechanism of FIG. 6; and FIG. 8 is a section view of still another form of valve embodying features of this invention.

Figure 1:
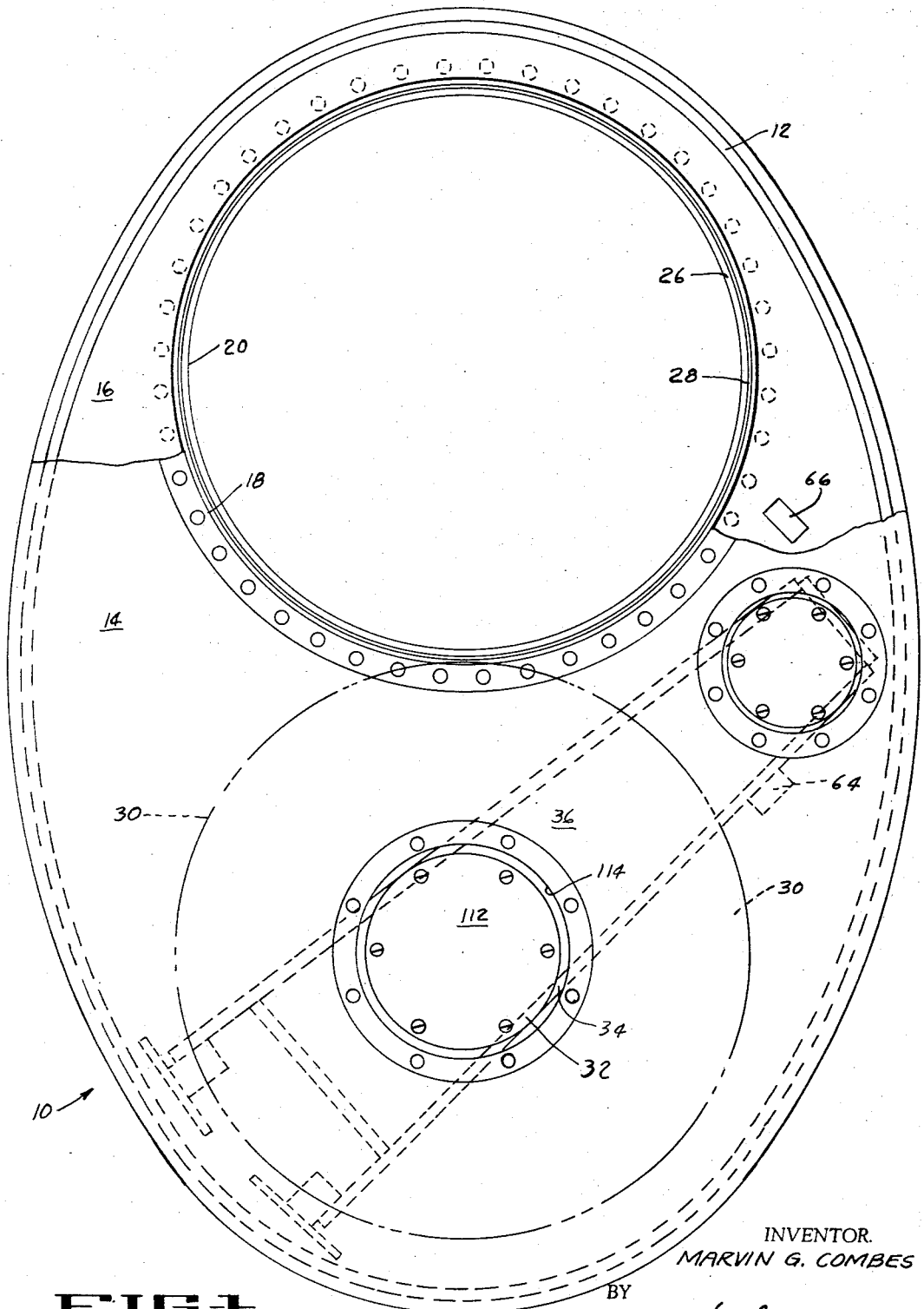
FIG. 1 is a top plan view, partially broken away, showing a swinging disc valve embodying features of this invention.

Referring to the drawings in greater detail, and particularly to FIGS. 1 and 2, the valve 10 of this invention is preferably of sandwich-type construction which entails the provision of an endless, intermediate body band 12 welded or otherwise firmly secured between a pair of end plates 14 and 16 to form a fluid-tight housing. As shown in FIG. 1, the end plates may be of generally oval configuration, and offset toward one end are aligned flow passage openings 18 and 20, which, when the valve 10 is installed in a vacuum system, are in communication with flow ducts 22 (only one shown) to which they may be secured by cap screws 24. Embracing one of the flow passages 20, and preferably that connected to the evacuation system (not shown) is a valve seat 26 which is engaged by the smoothly finished under surface of the valve closure disc 30 to seal off the flow passage. Preferably sealing is improved by provision of a resilient seal ring 28 which is accommodated in a groove in either the valve disc 30 or the valve seat 26. When the valve is used in vacuum systems, it is desirable that it be moved into and out of sealing engagment in a direction transverse to the seat in order to avoid any sliding or grating action. However, it is desirable that the disc thereafter be moved parallel to the seat in order to provide full fluid flow when desired. By arranging the fluid passages 18 and 20 at one end of the oval valve plates 14 and 16 (FIG. 1), the disc 30 may be swung into the other end to leave the flow passages completely free. For this purpose, the valve disc 30 is carried on a hollow carrier arm 32 including side walls 34 between which are welded top and bottom walls 36 and 38 and end walls 39a and 39b to form a fluid-tight enclosure. A hollow shaft 40 is secured to the carrier arm 32 by means of cap screws 42 threaded into a flange 44 that is welded around the top of the shaft and further sealed at 45. The shaft 40 is, in turn, rotatably mounted in the valve housing 10 by means of bearings 46 carried in a bearing block 48 that extends through the bottom wall 16 of the valve housing and is secured in place by a threaded nut 49 with suitable seal rings 50 sealing around the shaft 40, and seal rings 52 rendering the housing wall 16 fluid-tight. The bearing 46 is secured in place by a threaded cap 54 through which the shaft 40 extends. A second threaded cap 56 is provided to secure an operating handle 58 or similar device for swinging the carrier arm 32. Swinging movement of the carrier arm is facilitated by a pair of wheels 60 which are rotatably mounted in suitable bearings 62 secured on the extending ends of carrier arm sides 34 and 36. Thus, as the control handle 58 is turned, the carrier arm 32 rolls on wheels 60 between the fully open position shown in FIG. 1 and a second position with the valve disc 30 in alignment with the valve seat 26, and the two positions may be determined by suitable stops 64 and 66.

Of course, the swinging movement of the valve disc carrier arm 32 is accomplished with the valve disc 30 elevated above the valve seat 26. Then, when the valve disc is positioned over the valve seat, it is necessary to move the valve disc axially into and out of sealing engagement with the seat. The mechanism for accomplishing this will now be described.

Secured to the back side of the valve closure disc 30 as by means of cap screws 68 is a small bracket 70, to which is fixed an upwardly extending screw 72. Threaded onto the screw 72 is an internally threaded operator 74 which is rotatably mounted within a sleeve 76 secured on the carrier arm 32. Rotation of the operator 74 within the sleeve 76 is facilitated by anti-friction bearings 78 on opposite sides of an annular flange 74a on the operator which holds it against axial movement in the sleeve 76. A retainer ring 79, which is secured on the lower end of the sleeve, as by means of cap screws 80, holds the bearings in place.

A flange 82 carried on the sleeve 76 is secured to the bottom wall 38 of the hollow carrier arm 32 for support of the operator sleeve 76 below the carrier arm bottom panel 38. A bellows 84 is secured between the plates 82 and 70 on the sleeve 76 and the valve disc, respectively, by clamping the rings 86 and 87 on the ends of the bellows 84 under the plates. Suitable seal rings 88 and 89 on the end plates render the bellows 84 fluid-tight. Thus, the carrier arm forms a sealed enclosure, and the bellows forms a fluid-tight extension of a carrier arm to enclose the operating mechanism 72, 74 completely and thereby isolate it from the vacuum within the valve housing 10.

Rotation of the threaded operator 74 may be produced by any suitable means, such as a sprocket 92 secured on its upper end. Then the sprocket is rotated by means of a chain 94 which is engaged on a drive sprocket 96 keyed onto a drive shaft 98 rotatably carried within the hollow shaft and secured in place by engagement of the threaded cap 56 against a collar 99 on the shaft. The central shaft 98 is rotatably mounted within the hollow shaft 40 by means of suitable bearings 100 at the upper and lower ends thereof.

In operation, the valve disc 30 is first swung from the inactive position shown in FIG. 1 to a second, active position in alignment with the valve seat which position may be determined by the stop 66. This swinging motion is achieved simply by moving the lever arm 58 that is keyed to the lower end of the hollow shaft to rotate it through a suitable arc. After the valve disc 30 is in active position in alignment with the valve seat, the central shaft 98 is rotated to turn the drive sprocket 96 which, through the chain 94 and driven sprocket 92, rotates the internally threaded operator 74. Since the operator cannot move axially, the complementary screw 72 is caused to move axially within it until the valve disc 30 is in firm sealing engagement on the seat 26. Then, when it is desired to open the valve, the reverse operation is performed and the central drive shaft is first rotated to rotate the threaded operator 74 and cause the male threaded member 72 to be threaded upwardly, thereby withdrawing the valve disc 30 from the valve seat 26. Then, the hollow carrier arm 32 may be pivoted by means of the lever 58 keyed on the lower end of the hollow shaft 40 to again swing the disc 30 to the inactive position shown in FIG. 1.

Because all of the mechanisms for operating the valve are enclosed within sealed, hollow members isolated from the evacuation system to which the interior of the valve 10 is exposed, the bearings, sprockets and the like may be lubricated. Specifically, the sprockets 92, 96 and chain and threaded operators 72, 74, as well as the bearings on which they are rotated, are all contained within the hollow, sealed carrier arm 32 and the sealed extensible bellows 84 depending therefrom. Similarly, the bearings 46 for the hollow shaft 40 are contained within the lower end of the bearing block 48 which, as has been described, is sealed from the interior of the valve body. The wheels 60 that support the carrier arm 32 are exposed to the vacuum, but they carry a very light load while rolling and the bearings 62 are subjected to heavy load only while the valve is closed.

As a further feature of this invention, I provide for access to the operating mechanisms of the swing disc valve at the inner shaft end of the carrier arm by providing an access closure plate 104 (FIG. 2) that is normally sealed by suitable resilient seals 106 and secured by cap screws 108 to the valve body 10, and by a second closure plate 110 normally sealed at 111 to the inner end of the carrier arm. Also, at the outer end of the carrier arm, a closure plate 112 is normally secured and sealed at 113, but it may be removed for access to the driven sprocket 92 and other operating elements.

A port 114 in the upper valve plate 14 (FIG. 1) provides access to the carrier arm closure plate 112. The port 114 is normally covered, but both it and closure plate 104 are removed in FIG. 1 for purposes of illustration.

With the carrier arm access plate 112 removed, the driven sprocket 92 may be removed directly by removal of the keeper and the sleeve retainer plate 82 loosened by removal of cap screws 86. This also results in loosening of the bellows 84 for similar removal. When the sleeve 76 and operator 74 are removed by threading the entire assembly along the valve disc operating screw 72, and the valve 10 is removed from the line in which it is installed, the carrier arm 32 may be pivoted to one side and the entire valve disc 30 removed through the upper flow passageway 18.

Similarly, the carrier arm operating elements may be removed progressively once the drive sprocket 96 has been removed through the access opening 104. Thus, the lower cap 56 may be removed to permit removal of the central shaft 98 and the hollow shaft 40 disconnected from the carrier arm by removing the cap screws 42. Then with the carrier arm moved aside, the hollow shaft and the bearing block 48 may be removed through the acess openings.

Referring to FIGS. 4 and 5, a second form of this invention is disclosed involving the use of hydraulic or pneumatic pressure to assist in operation of the valve. There, a piston 116 is secured to the closure disc 30a as by threading it into a block 118 that is secured to the back of the disc by means of cap screws 119. The piston 116 is slidably engaged within a cylinder 120 that is closed at one end by a plate 122 which is secured within a hollow vessel 123 formed by cross vertical panels 124 and horizontal cross panels 126 and 127 welded between the carrier arm bars 34. The upper cross panel 126 includes an access plate 126a. As in the first embodiment, a bellows 128 is secured between the hollow vessel 123 and the back of the valve disc 30a to form an extensible chamber extension of the hollow vessel 123. The piston 116 is provided with seals at 130 around its shank and at 132 with the cylinder wall so that the hydraulic system is fluid-tight. Suitable conduits 134 and 135 which may be connected selectively to a pressure source and sump (not shown) by means of a suitable valve 136 open into opposite ends of the cylinder to force the piston up or down and carry the valve disc 30a into and out of the sealing position shown in FIG. 5. The fluid lines preferably extend through a hollow arm 138 that opens into a hollow bearing housing 140 to the bottom of which is secured a hollow shaft 40a through which the fluid lines 134 and 135 extend.

Thus, in operating the valve, the lever 58 is first operated to swing the disc 30a by the carrier arm until the valve disc is positioned in alignment with the valve seat 26. Then, the control valve device 136 is operated to drive the piston down to the position shown in FIG. 5 wherein the valve disc is in sealing position.

In a still further form of the invention shown in FIGS. 6 and 7, the axial operation of the valve disc is by means of a lever arrangement including a rod 142 slidable within the hollow shaft 40 and a second rod 144 which is welded onto a bracket 146 secured to the back of the valve disc 30b. The disc-carrying rod 144 is slidable in a bearing block 147 mounted on a plate 148 which, in turn, is secured to the lower wall of the hollow carrier arm 32.

Again, an extensible bellows 84 is secured between the carrier arm 32 and the valve disc 30b to provide an extensible, sealed extension of the hollow carrier arm. The structure of the carrier arm itself is similar to that of the first embodiment and will not be described again. However, in this embodiment, a fulcrum 150 is secured to the bottom panel 38 within the carrier arm 32 and a lever 152 which is pivotally connected at its ends to the operator rods 142 and 144 is pivotally connected at 154 intermediate its length to the fulcrum so that reciprocal movement of the operating rod 142 will be transmitted through the lever 152 to the driven rod 144, to cause the valve disc 30b to be lifted from its seat.

In this embodiment, the gate 30b may be removed through the opening 160 in the bottom plate 16 by removing the seat 162 which is slidably received in the opening and held in place by engagement of the connecting flange 164 on the duct 166 in which the valve is installed. Seals 168 and 170 around the outside and the bottom of the seat, respectively, seal the joint, and resilient seal 172 provides a fluid-tight seal with the gate 30b.

In the embodiment of FIG. 8, the valve disc 180 is loosely supported on the end of a cantilever arm 182 by engagement of a stub shaft 184 integral with the valve disc through an opening 186 in the arm. The disc is held against dislodgement by suitable means such as a snap ring 188. The arm 182 is carried on a shaft 190 which is both rotatable and slidable within a bearing assembly 192 as by manipulation of a lever arm 194 keyed thereto. Thus, an operator could raise the shaft 190 within the bearing member 192 to lift it from the seat 162 and then rotate the shaft to swing it free of the duct opening 166.

The bearing assembly 192 preferably includes one or more bearing sleeves 195 and a radial flange 196 by means of which the bearing is secured to the lower valve plate 16 as by means of cap screws 198. The bearing assembly 192 is contained within an extensible bellows 200 and is thereby isolated from the vacuum within the valve. At one end of the bellows 200, a ring 204 is rotatably received on the shaft 190 and held against axial movement thereon as by means of a snap ring 206. A suitable resilient seal 208 effects a fluid-tight joint with the shaft 190 while permitting rotation thereof. At the other end of the bellows 200, a ring is clamped between the bearing assembly flange 196 and the bottom valve plate 16, to which it is sealed at 210.

Thus, the valve 180 may be moved away from the seat 172 simply by raising the shaft 190, and this movement is permitted by extension of the bellows 200. Then, the shaft may be rotated to pivot the arm 182 and carry the disc 180 away from the seat as in other embodiments disclosed herein, and this rotation is permitted by the bearing sleeves 195 and the sealing ring 204.

While this invention has been described in conjunction with preferred embodiments thereof, it is to be understood that modifications and changes in such embodiments may be made by those skilled in the art without departing from the spirit and scope of this invention as defined by the claims appended hereto.

Having described my invention, I claim:

1. A valve construction comprising:
   a valve body having inlet and outlet flow passages,
   a valve seat intermediate said passages,
   a shaft member rotatably mounted on said body,
   a fluid-tight hollow carrier arm supported on said shaft member intermediate said flow passages for oscillatory movement in a plane generally parallel to said seat,
   a valve closure plate carried by said carrier arm for movement therewith between an active position in alignment with said seat and an open position displaced therefrom,
   said closure plate being axially movable on said carrier arm,
   means forming a passageway longitudinally through said shaft member into sealed communication with said hollow carrier arm, and
   motion transmitting means separate from said passageway and said carrier arm and extending therethrough to produce axial movement of said closure plate,
   said motion transmitting means being in fluid-tight isolation from the interior of said valve body continuously from a power souce outside said valve body through said carrier arm.

2. The valve construction defined by claim 1 wherein said motion transmitting means comprises:
a rod movably carried in said passageway, and
mechanical means connecting said rod and said closure plate to produce axial movement of said closure plate in response to movement of said rod.

3. The valve construction defined by claim 2 wherein said rod is axially movable in said passageway and including:
a fulcrum supported within said carrier arm, and
a lever pivotally connected to said rod, said fulcrum and said closure plate.

4. The valve construction defined by claim 2 wherein said rod is rotatably mounted in said shaft member and including:
a connector rotatably mounted on said carrier arm and threadedly connected to said closure plate so that rotational movement of said connector produces axial movement of said closure plate, and
mechanical means connecting said rod and said connector to transmit rotational movement from said rod to said connector.

5. A valve construction comprising:
a valve body having inlet and outlet flow passages,
a valve seat intermediate said passages,
a shaft member rotatably mounted on said body,
a fluid-tight hollow carrier arm supported on said shaft member intermediate said flow passages for oscillatory movement in a plane generally parallel to said seat,
a valve closure plate carried by said carrier arm for movement therewith between an active position in alignment with said seat and an open position displaced therefrom,
an extensible connection between said closure plate and said carrier arm for effecting axial movement of said closure plate,
an extensible sleeve around said connection and sealed between said closure plate and said carrier arm,
means forming a passageway longitudinally through said shaft member into sealed communication with said hollow carrier arm, and
motion transmitting means separate from said passageway and said carrier arm and extending therethrough to operate said connection,
said motion transmitting means being in fluid-tight isolation from the interior of said valve body continuously from a power source outside said valve body to said extensible connection.

6. The valve construction defined by claim 5 wherein: said extensible connection comprises:
a fulcrum supported within said carrier arm and
a lever pivotally connected to said fulcrum and said closure plate,
and said motion transmitting means comprising:
a rod rotatably mounted in said passageway, and pivotally connected to said lever.

7. The valve construction defined by claim 5 wherein: said extensible connection comprises:
a connector rotatably mounted on said carrier arm and threadedly connected to said closure plate so that rotational movement of said connector produces axial movement of said closure plate,
and said motion transmitting means comprises:
a rod rotatably mounted in said passageway, and mechanical means connecting said rod and said connector to transmit rotational movement from said rod to said connector.

8. The valve construction defined by claim 7 wherein: said mechanical means comprises first and second rotary wheels on said connector and said rod, respectively and an endless member in positive driving connection between said rotary wheels.

9. The valve construction defined by claim 5 including:
means aligned with said extensible connection forming an access opening in said hollow carrier arm,
a cover for said access opening,
means sealing between said cover and said carrier arm around said access opening, and
releasable means securing said cover on said carrier arm.

10. The valve construction defined by claim 9 including:
means accessible through said access opening releasably connecting said closure member to said carrier arm.

11. The valve construction defined by claim 5:
wherein said extensible connection comprises:
a pressure fluid cylinder member and a piston member slidable therein,
one of said members being carried on said carrier arm and the other of said members being carried on said closure plate; and
said motion transmitting means comprising:
pressure and return fluid lines extending through said shaft member and along said carrier arm into communication with said cylinder member.

References Cited

UNITED STATES PATENTS

| | | | |
|---|---|---|---|
| 712,485 | 11/1902 | Bickford | 251—175 |
| 2,042,067 | 5/1936 | Leach | 251—175 X |
| 2,325,802 | 8/1943 | Schmidt | 251—175 X |
| 2,858,096 | 10/1958 | Warren | 251—175 X |
| 3,237,916 | 3/1966 | Bryant | 251—158 |

FOREIGN PATENTS

| | | |
|---|---|---|
| 1,182,619 | 1/1959 | France. |
| 1,227,716 | 3/1960 | France. |

WILLIAM F. O'DEA, *Primary Examiner.*

HAROLD WEAKLEY, *Examiner.*